United States Patent
Kato

(10) Patent No.: US 10,416,644 B2
(45) Date of Patent: Sep. 17, 2019

(54) PROGRAMMABLE CONTROLLER AND SYNCHRONIZATION CONTROL PROGRAM

(71) Applicant: Mitsubishi Electric Corporation, Chiyoda-ku (JP)

(72) Inventor: Yuta Kato, Aichi (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/770,501

(22) PCT Filed: Jan. 7, 2016

(86) PCT No.: PCT/JP2016/050341
§ 371 (c)(1),
(2) Date: Apr. 24, 2018

(87) PCT Pub. No.: WO2017/119100
PCT Pub. Date: Jul. 13, 2017

(65) Prior Publication Data
US 2018/0307194 A1 Oct. 25, 2018

(51) Int. Cl.
*G05B 19/05* (2006.01)
*G05B 19/418* (2006.01)

(52) U.S. Cl.
CPC ......... *G05B 19/054* (2013.01); *G05B 19/056* (2013.01); *G05B 19/4185* (2013.01); *G05B 2219/1211* (2013.01); *Y02P 90/02* (2015.11)

(58) Field of Classification Search
CPC ............. H04L 12/403; H04L 12/40; H04L 2012/4026; H04L 12/10; H04L 7/06;
(Continued)

(56) References Cited

U.S. PATENT DOCUMENTS

| 8,644,170 | B2* | 2/2014 | Jalali | H04L 1/0002 370/252 |
| 9,979,432 | B2* | 5/2018 | Khan | H04B 1/40 |
| 2017/0222685 | A1* | 8/2017 | Khan | H04B 1/40 |

FOREIGN PATENT DOCUMENTS

| JP | 2005-293312 A | 10/2005 |
| JP | 2005-293569 A | 10/2005 |
| JP | 2012-168679 A | 9/2012 |

OTHER PUBLICATIONS

International Search Report dated Mar. 1, 2016 in PCT/JP2016/050341, filed Jan. 7, 2016.

* cited by examiner

*Primary Examiner* — Mark S Blouin
(74) *Attorney, Agent, or Firm* — Oblon, McClelland, Maier & Neustadt, L.L.P.

(57) ABSTRACT

A programmable controller periodically controls a plurality of external devices. The programmable controller includes a temporary memory, a working memory, and a control unit. The control unit transmits request packets to each of the external devices, the request packets requesting transmission of device data to be used in control of the external devices, the external devices being targets to be subjected to synchronization control, acquires the device data from response packets received from the external devices in response to the request packets, and stores the acquired device data into the temporary memory, and writes the device data stored in the temporary memory into the working memory on the condition that the respective response packets in response to the request packets transmitted within the same control period are received from the external devices.

4 Claims, 8 Drawing Sheets

(58) Field of Classification Search
CPC ........... H04L 12/40026; H04L 12/4035; H04L 25/4902; H04L 43/00
USPC ...................................................... 340/3.21
See application file for complete search history.

PROGRAMMABLE CONTROLLER AND SYNCHRONIZATION CONTROL PROGRAM

FIELD

The present application relates to a programmable controller that controls external devices that are industrial machines, and to a synchronization control program.

BACKGROUND

In related art, a programmable controller that controls a plurality of external devices, which are industrial machines used in a factory, has functions for performing synchronization of data received from the external devices (refer to Patent Literature 1, for example).

CITATION LIST

Patent Literatures

Patent Literature 1: Japanese Patent Application Laid-open No. 2005-293569

SUMMARY

Technical Problem

The technology of the related art is required to provide a ladder program for correcting failure in a process of synchronizing device data if such failure occurs.

The present invention has been made in view of the above, and an object thereof is to provide a programmable controller and a synchronization control program capable of preventing the failure in the synchronization process in a simple manner without needing to provide the ladder program for correcting the failure in the synchronization process.

Solution to Problem

To solve the aforementioned problems and achieve the object, the present invention provides a programmable controller that periodically controls a plurality of external devices and includes a temporary memory, a working memory, and a control unit. The control unit transmits request packets to each of the external devices, the request packets requesting transmission of device data to be used in control of the external devices, the external devices being targets to be subjected to synchronization control, acquires the device data from response packets received from the external devices in response to the request packets, and stores the acquired device data into the temporary memory, and writes the device data stored in the temporary memory into the working memory on the condition that the respective response packets in response to the request packets transmitted within one control period are received from the external devices that are the targets to be subjected to the synchronization control.

Advantageous Effects of Invention

According to the present invention, the programmable controller can prevent the failure in the synchronization process in the simple manner without needing to provide the ladder program for correcting the failure in the synchronization process.

DESCRIPTION OF EMBODIMENTS

First Embodiment

Embodiments of the present invention will now be described with reference to the drawings. Note that the present invention is not limited to the embodiments.

Figure 1:
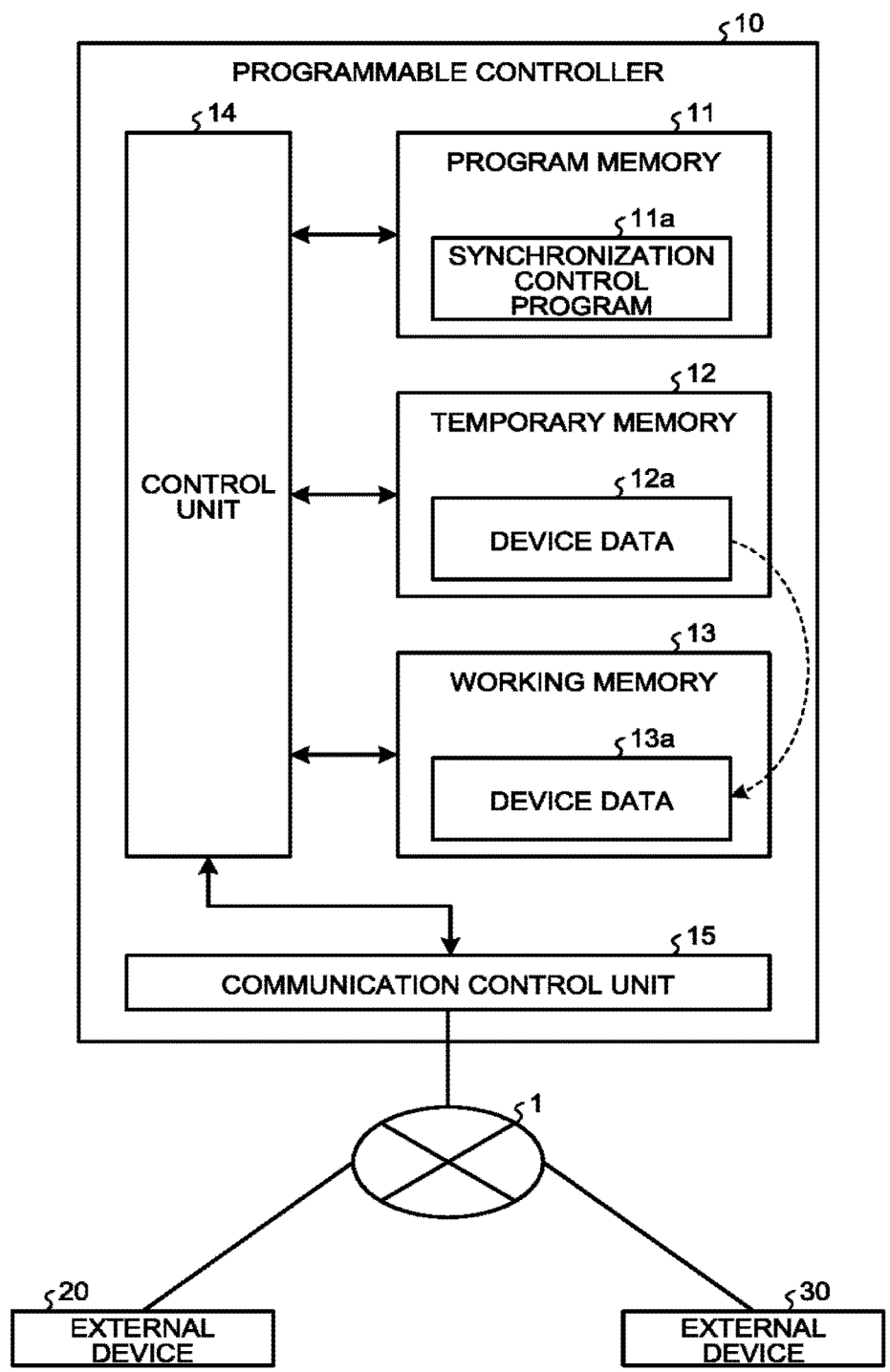
FIG. 1 is a diagram illustrating an example of a functional configuration of a programmable controller according to a first embodiment.

FIG. 1 is a diagram illustrating an example of a functional configuration of a programmable controller according to a first embodiment. As illustrated in FIG. 1, the programmable controller 10 according to the first embodiment is connected via a network 1 to an external device 20 and an external device 30 such that the programmable controller 10 can perform communication relating to transmission and reception of data, with the external device 20 and the external device 30. The network 1 may include a local area network (LAN) such as the Internet or Ethernet (registered trademark).

The programmable controller 10 includes a program memory 11, a temporary memory 12, a working memory 13, a control unit 14, and a communication control unit 15. FIG. 1 illustrates only functional units necessary for description of the programmable controller 10 according to the first embodiment.

The program memory 11 stores programs for implementing various controls in the programmable controller 10. The program memory 11 stores a synchronization control program 11a, for example. The synchronization control program 11a can provide functions for synchronizing device data that is control data used for controlling the external devices that are targets to be subjected to synchronization control. The functions provided by the synchronization control program 11a, which include a process of retrieving the device data from the external devices 20 and 30 capable of communicating with the programmable controller 10 connected thereto, include functions for performing the below processes in sequence scan (hereinafter referred to as scan) performed periodically. Specifically, the functions provided by the synchronization control program 11a include the following functions within the same scan being performed: a function of transmitting request packets requesting device data, to the external devices 20 and 30 that are the targets to be subjected to the synchronization control; a function of acquiring the device data from response packets received from the external devices 20 and 30 in response to the request packets and storing the acquired device data into the temporary memory 12; and a function of reading from the temporary memory 12 the device data stored temporarily in the temporary memory 12 and writing the read device data into the working memory 13 on the condition that the response packets associated with the request packets transmitted within that the same scan to the external devices 20 and 30 that are the targets to be subjected to the synchronization control are received from the external devices 20 and 30, respectively. By virtue of the functions provided by the synchronization control program 11a, the timing at which the device data on the external device 20 that is the target to be subjected to the synchronization control is reflected from the temporary memory 12 into the working memory 13 is synchronized with the timing at which the device data on the external device 30 that is the target to be similarly subjected to the synchronization control is reflected from the temporary memory 12 into the working memory 13.

The temporary memory 12 temporarily stores device data 12a. The device data 12a, which corresponds to the device data contained in the response packets received from the external devices 20 and 30, is stored in the temporary memory by the control unit 14. The working memory 13 stores device data 13a. The device data 13a, which corresponds to the device data 12a stored in the temporary memory 12, is written into the working memory 13 by the control unit 14. The working memory 13 may also be used as a work area in which results of processing by the control unit 14 are temporarily stored. The temporary memory 12 and the working memory 13 may be individually divided into a storage area in which the device data received from the external device 20 are stored and a storage area in which the device data received from the external device 30 are stored. The division into the storage areas may be virtual or physical.

The control unit 14 performs various controls in the programmable controller 10 by executing various programs stored in the program memory 11. Specifically, referring to data acquired from respective units in the programmable controller 10, the control unit 14 executes the instructions included in the programs, thereby performing the various controls in the programmable controller 10.

In the first embodiment, the control unit 14 executes the synchronization control program 11a to thereby implement a process of synchronizing the device data on the external devices that are the targets to be subjected to the synchronization control. Specifically, during execution of a scan, the control unit 14 transmits request packets requesting device data, to the external devices 20 and 30 that are the targets to be subjected to the synchronization control. Thus, the request packet is transmitted from the control unit 14 to each of the external devices 20 and 30 within the same scan being performed, the devices being the targets to be subjected to the synchronization control. Upon receiving the response packet from the external device 20 or the external device 30, the control unit 14 acquires the device data from the received response packet and successively stores the acquired device data into the temporary memory 12. Upon moving to an END process, which is a final process in the scan, the control unit 14 determines whether the response packets associated with the request packets transmitted within the same scan to the external devices 20 and 30 that are the targets to be subjected to the synchronization control have been received from the external device 20 and the external device 30. When the response packet has not been received from at least one of the external devices 20 and 30 that are the targets to be subjected to the synchronization control, the control unit 14 terminates the END process and moves to a next scan, and continues to repeat the determination of whether the response packet to the transmitted request packet has been received, the repetition of the determination being made until the reception of the response packets from the external devices 20 and 30 is completed. If the reception of the response packets from both of the external devices 20 and 30 that are the targets to be subjected to the synchronization control, the control unit 14 reads the device data on the external devices 20 and 30 from the temporary memory 12 and writes the respective device data into the working memory 13. As described above, the control unit 14, which by executing the synchronization control program 11a, implements the process of synchronizing the timing at which the device data on the external device 20 is reflected from the temporary memory 12 into the working memory 13, with the timing at which the device data on the external device 30 is reflected from the temporary memory 12 into the working memory 13.

The communication control unit 15 controls transmission and reception of data between the external device 20 and the external device 30.

Figure 2:
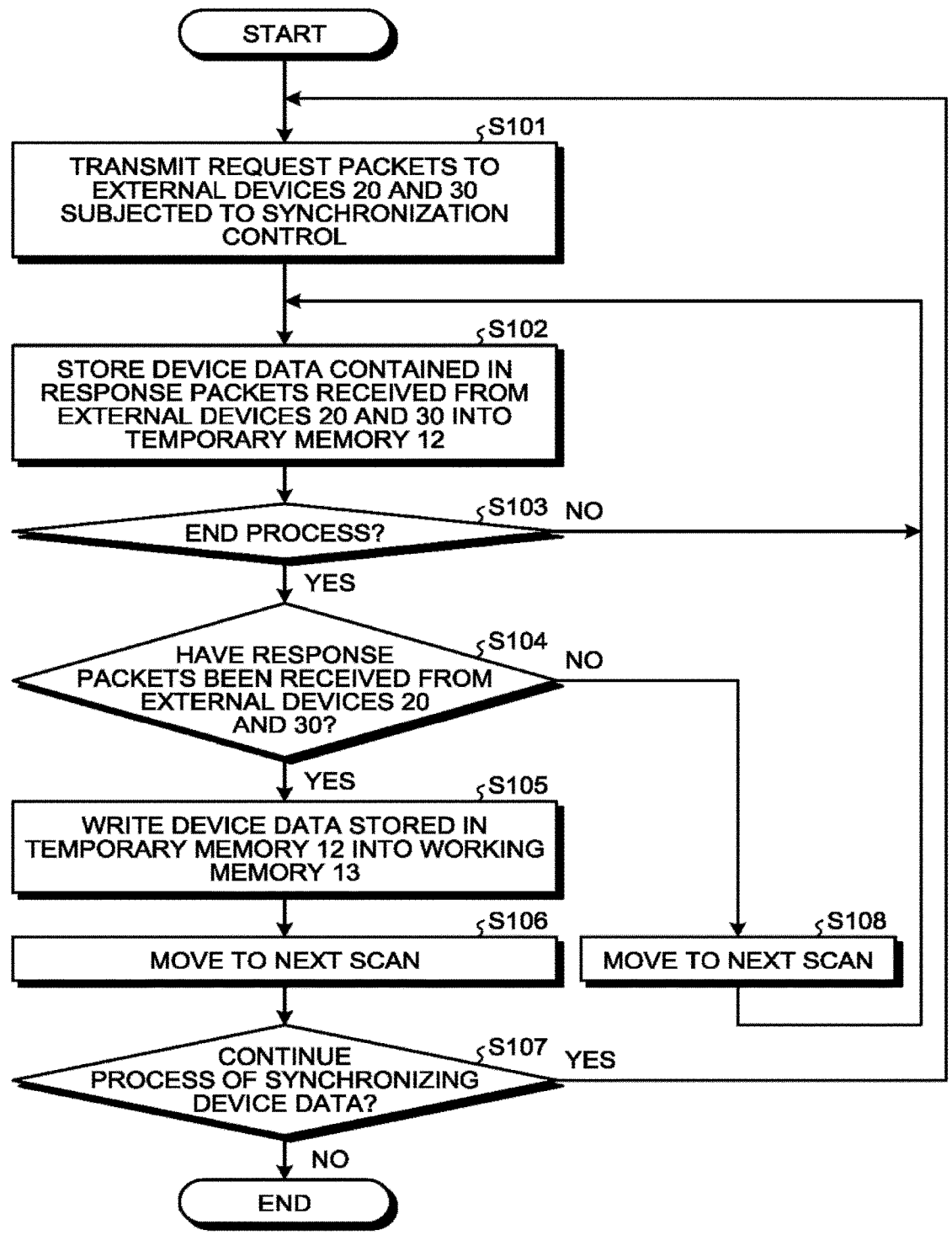
FIG. 2 is a flowchart illustrating an example of processing performed by the programmable controller according to the first embodiment.

FIG. 2 is a flowchart illustrating an example of processing performed by the programmable controller 10 according to the first embodiment. The processing illustrated in FIG. 2 is implemented by the control unit 14 executing the synchronization control program 11a stored in the program memory 11.

As illustrated in FIG. 2, during execution of a scan, the programmable controller 10 transmits request packets to the external devices 20 and 30 that are the targets to be subjected to the synchronization control (step S101).

Subsequently, the programmable controller 10 stores into the temporary memory 12 the device data contained in the response packets received from the external devices 20 and 30 (step S102). The programmable controller 10 successively stores the device data into the temporary memory 12 upon receiving the response packet.

Subsequently, the programmable controller 10 determines whether the scan is in the END process that is the final process of the scan (step S103).

If the result of the determination indicates that the scan is not in the END process (step S103, No), the programmable controller 10 returns to the procedure of step S102 described above.

If the result of the determination indicates that the scan is in the END process (step S103, Yes), the programmable controller 10 determines whether the response packets associated with the request packets transmitted in S101 have been received from the external devices 20 and 30 (step S104).

If the result of the determination indicates that the response packets have been received from both of the external devices 20 and 30 (step S104, Yes), the programmable controller 10 writes into the working memory 13 the device data stored in the temporary memory 12 (step S105), terminates the END process, and moves to the next scan (step S106).

Subsequently, the programmable controller 10 determines whether to continue the synchronization processing on the device data (step S107). The programmable controller 10 determines to continue the synchronization processing except, for example, when an abnormal process has occurred or when a halt instruction is made by a user.

If the result of the determination indicates that the synchronization processing on the device data is to be continued (step S107, Yes), the programmable controller 10 returns to the procedure of step S101 described above.

If the result of the determination indicates that the synchronization processing on the device data is not to be continued (step S107, No), the programmable controller 10 terminates the processing illustrated in FIG. 2.

If, in step S104 described above, the result of the determination indicates that the response packet has not been received from at least one of the external devices 20 and 30 (step S104, No), the programmable controller 10 terminates the END process, moves to the next scan (step S108), and returns to the procedure of step S102 described above.

In the first embodiment, the programmable controller 10 reads the device data temporarily stored in the temporary memory 12 and writes the read device data into the working memory 13 on the condition that the response packets associated with the request packets transmitted within the same scan are received from the external devices 20 and 30 that are the targets to be subjected to the synchronization control. This allows the programmable controller 10 to synchronize the timing at which the device data on the external device 20 is reflected from the temporary memory 12 into the working memory 13, with the timing at which the device data on the external device 30 is reflected from the temporary memory 12 into the working memory 13. The programmable controller 10 thus prevents failure in the synchronization process in the simpler manner than providing a ladder program to correct failure in the synchronization processing.

In addition, in the first embodiment, the programmable controller 10 reliably synchronizes the device data because unless both of the device data on the external device 20 that is the target to be subjected to the synchronization control and the device data on the external device 30 that is the target to be subjected to the synchronization control are stored in the temporary memory 12, the programmable controller 10 does not reflect the device data from the temporary memory 12 into the working memory 13 even at the time of the END process of the scan.

Although the first embodiment has been described giving an example in which the programmable controller 10 performs the synchronization control on the device data received from the two external devices, which are the external devices 20 and 30, the synchronization control according to the first embodiment can be similarly performed on device data received from three or more external devices.

Second Embodiment

The first embodiment gives the example of processing in which, when at the time of the END process of the scan the response packet has not been received from at least one of the external devices 20 and 30 that are the targets to be subjected to the synchronization control, the programmable controller 10 continues to repeat the determination of whether the response packet to the transmitted request packet has been received, the repetition of the determination being made until the reception of the response packets from the external devices 20 and 30 is completed. The processing, however, is not limited to this example. When at the time of the END process of the scan the response packet has not been received from at least one of the external devices 20 and 30 that are the targets to be subjected to the synchronization control, the programmable controller 10 may continue waiting for reception of the response packet to the transmitted request packet within the same scan without terminating the running scan. The synchronization control program 11a can provide a function of placing the END process in a communication standby state to hold a state of waiting for reception of a response packet, and the control unit 14 can executes the synchronization control program 11a to thereby implement processing of placing the END process in the communication standby state to hold the state of waiting for the reception of the response packet.

Figure 3:
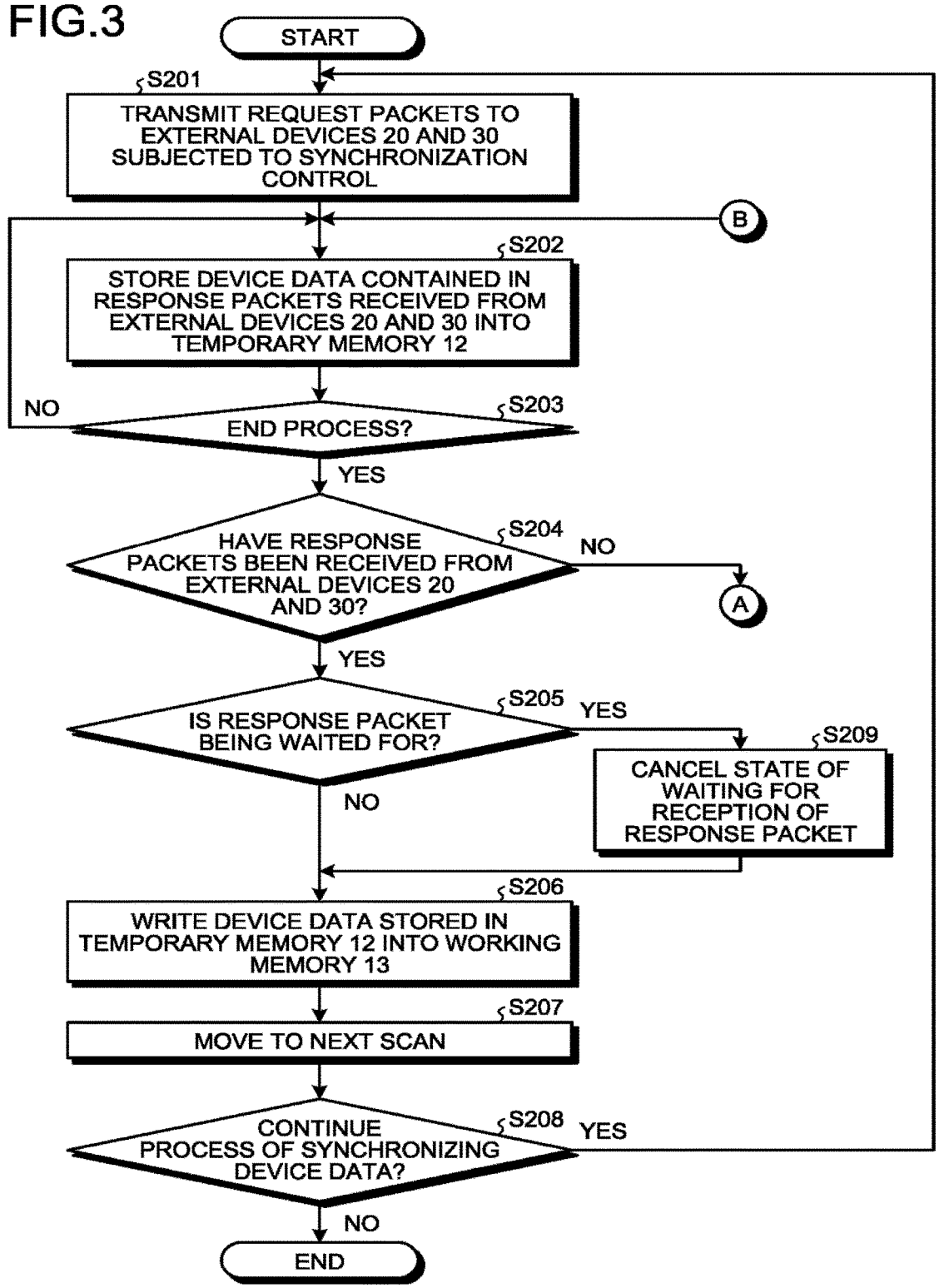
FIG. 3 is a flowchart illustrating an example of processing performed by a programmable controller according to a second embodiment.
Figure 4:
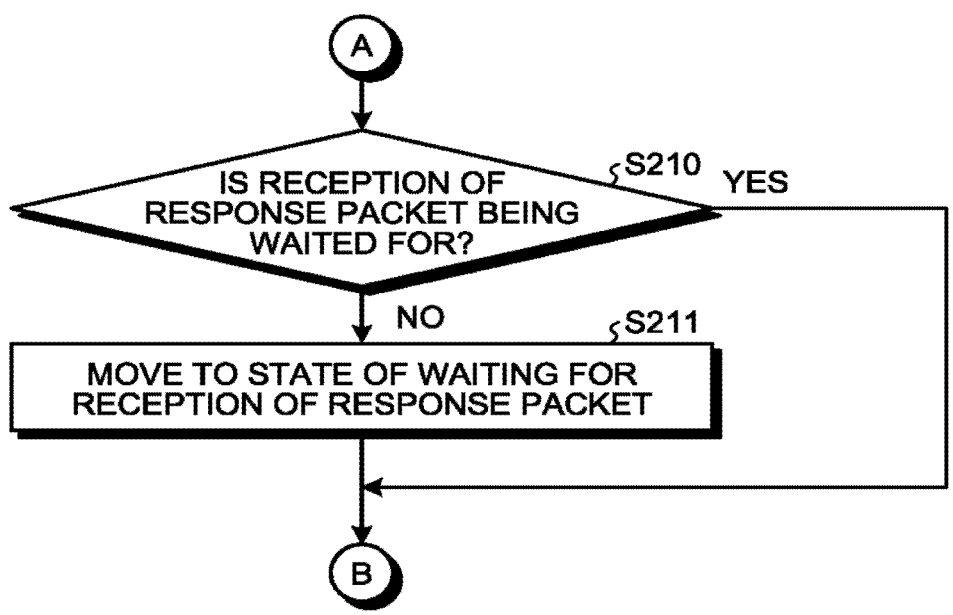
FIG. 4 is a flowchart illustrating an example of the processing performed by the programmable controller according the second embodiment.

An example of processing performed by a programmable controller 10 according to a second embodiment will be described with reference to FIGS. 3 and 4. FIGS. 3 and 4 are flowcharts illustrating an example of processing performed by the programmable controller 10 according to the second embodiment.

As illustrated in FIG. 3, during execution of a scan, the programmable controller 10 transmits request packets to the external devices 20 and 30 that are the targets to be subjected to the synchronization control (step S201).

Subsequently, the programmable controller 10 stores into the temporary memory 12 the device data contained in the response packets received from the external devices 20 and 30 (step S202). The programmable controller 10 successively stores the device data into the temporary memory 12 upon receiving the response packet.

Subsequently, the programmable controller 10 determines whether the scan is in the END process that is the final process of the scan (step S203).

If the result of the determination indicates that the scan is not in the END process (step S203, No), the programmable controller 10 returns to the procedure of step S202 described above.

If the result of the determination indicates that the scan is in the END process (step S203, Yes), the programmable controller 10 determines whether the response packets associated with the request packets transmitted in S201 have been received from the external devices 20 and 30 (step S204).

If the result of the determination indicates that the response packets have been received from both of the external devices 20 and 30 (step S204, Yes), the programmable controller 10 determines whether reception of a response packet is already being waited for (step S205).

If the result of the determination indicates that the reception of the response packet is not being waited for (step S205, No), the programmable controller 10 writes into the working memory 13 the device data stored in the temporary memory 12 (step S206), terminates the END process, and moves to the next scan (step S207).

Subsequently, the programmable controller 10 determines whether to continue the synchronization processing on the device data (step S208). The programmable controller 10 determines to continue the synchronization processing except, for example, when an abnormal process has occurred or when a halt instruction is made by a user.

If the result of the determination indicates that the synchronization processing on the device data is to be continued (step S208, Yes), the programmable controller 10 returns to the procedure of step S201 described above.

If the result of the determination indicates that the synchronization processing on the device data is not to be continued (step S208, No), the programmable controller 10 terminates the processing illustrated in FIG. 3.

If the result of the determination in step S205 described above indicates that the reception of the response packet is being waited for (step S205, Yes), the programmable controller 10 cancels the state of waiting for the reception of the response packet (step S209), and moves to the procedure of step S206 described above.

If the result of the determination in step S204 described above indicates that the response packet has not been received from at least one of the external devices 20 and 30 (step S204, No), the programmable controller 10 determines whether the reception of the response packet is already being waited for (step S210).

If the result of the determination indicates that the reception of the response packet is not being waited for (step S210, No), the programmable controller 10 moves to the state of waiting for the reception of the response packet (step S211) and returns to the procedure of step S202 described above. Conversely, if the result of the determination indicates that the reception of the response packet is being waited for (step S210, Yes), the programmable controller 10 returns directly to the procedure of step S202 described above.

In the second embodiment, the programmable controller 10 places the END process, which is the final process of the scan, in the communication standby state until the reception of the response packets from both of the external devices 20 and 30 that are the targets to be subjected to the synchronization control is completed. Since the placement of the END process in the communication standby state allows the programmable controller 10 to continues to wait for the reception of the response packet to the transmitted request packet, the programmable controller 10 can synchronize the device data within the same scan.

Third Embodiment

Although the second embodiment has been described giving an example in which the programmable controller 10 holds the state of waiting for the reception of the response packet until the response packets are received from both of the external devices 20 and 30 that are the targets to be subjected to the synchronization control, the processing is not limited to this example. The programmable controller 10 may hold the state of waiting for the reception of the response packet only when the time having elapsed from the transmission of request packets is within an allowable time.

Figure 5:
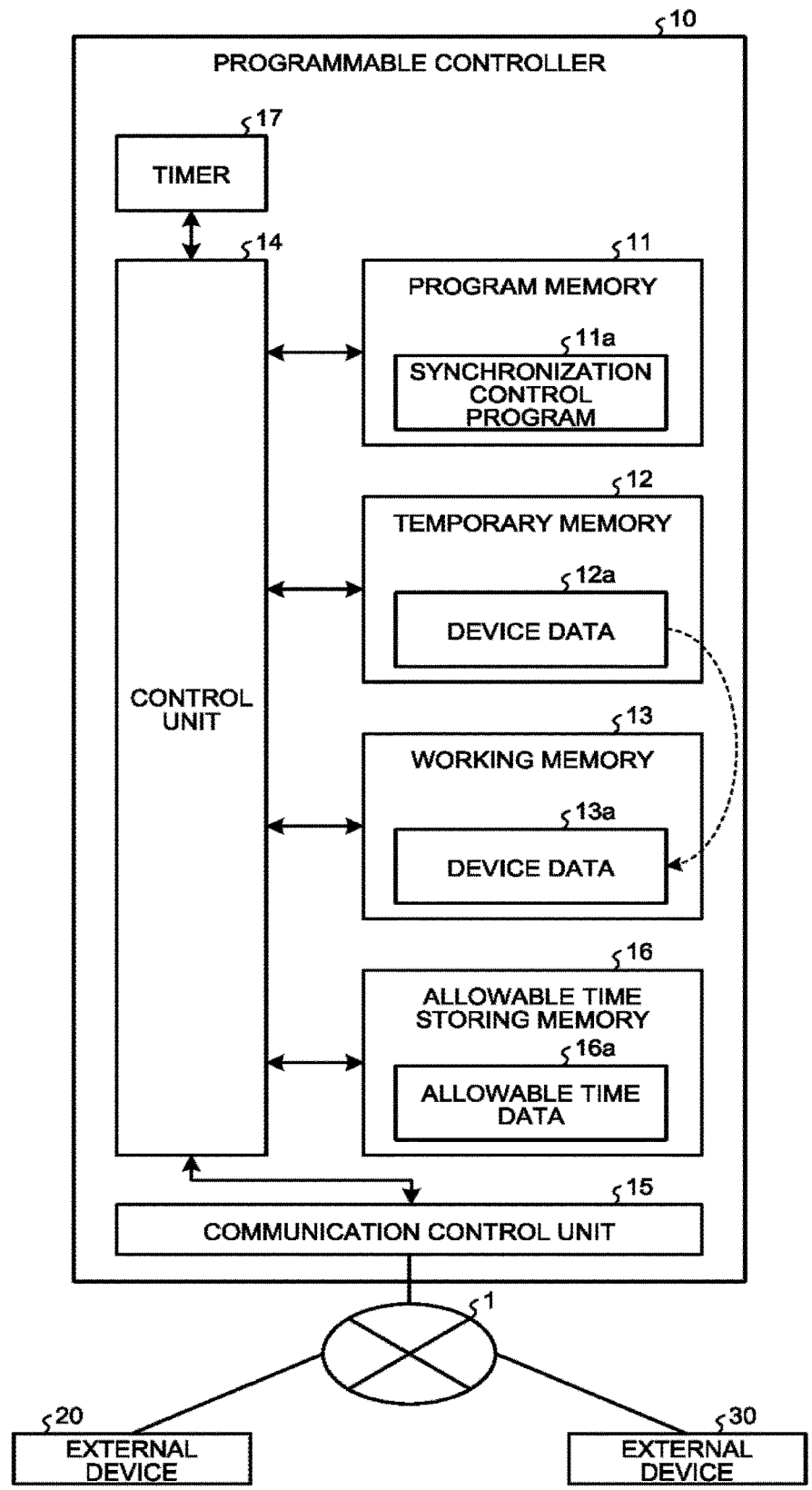
FIG. 5 is a diagram illustrating an example of functional configuration of a programmable controller according to a third embodiment.

FIG. 5 is a diagram illustrating an example of a functional configuration of a programmable controller 10 according to a third embodiment. As illustrated in FIG. 5, the programmable controller 10 according to the third embodiment includes an allowable time storing memory 16 and a timer 17 in addition to the functional units included in the programmable controller 10 according to the second embodiment.

The allowable time storing memory 16 stores allowable time data 16a. The allowable time data 16a are data set in advance as an allowable time during which the state of waiting for reception of a response packet is held. The allowable time corresponding to the allowable time data 16a is set to at least a time longer the time extending from start of a scan to an END process.

The timer 17 starts measuring the time in accordance with an instruction from the control unit 14. The timer 17 measures the time having elapsed from the transmission of request packets requesting device data. The timer 17 resets the measured time in accordance with an instruction from the control unit 14.

The synchronization control program 11a can provide a function of measuring the time triggered by the transmission of the request packets, a function of resetting the measured time before moving to the next scan, and a function of holding the state of waiting for reception of response packets associated with the request packets transmitted within the same scan when the time having elapsed from the transmission of the request packets has not exceeded the allowable time.

The control unit 14 executes the synchronization control program 11a to implement a process of starting time measurement by the timer 17 triggered by transmission of request packets. For example, when the control unit 14 transmits request packets, the control unit 14 sends to the timer 17 an instruction to perform time measurement. When The control unit 14 moves to the next scan, the control unit 14 sends to the timer 17 an instruction to reset the measured time. The control unit 14, which executes the synchronization control program 11a, implements a process of holding the state of waiting for reception of a response packet when the time having elapsed from the transmission of the request packets is within the allowable time. For example, if the response packets have not been received from both of the external devices 20 and 30 that are the targets to be subjected to the synchronization control, the control unit 14 determines whether the time measured by the timer is within the allowable time, and if the result of the determination indicates that the time is within the allowable time, the control unit 14 holds the state of waiting for reception of response packets associated with the request packets transmitted within the same scan.

Figure 6:
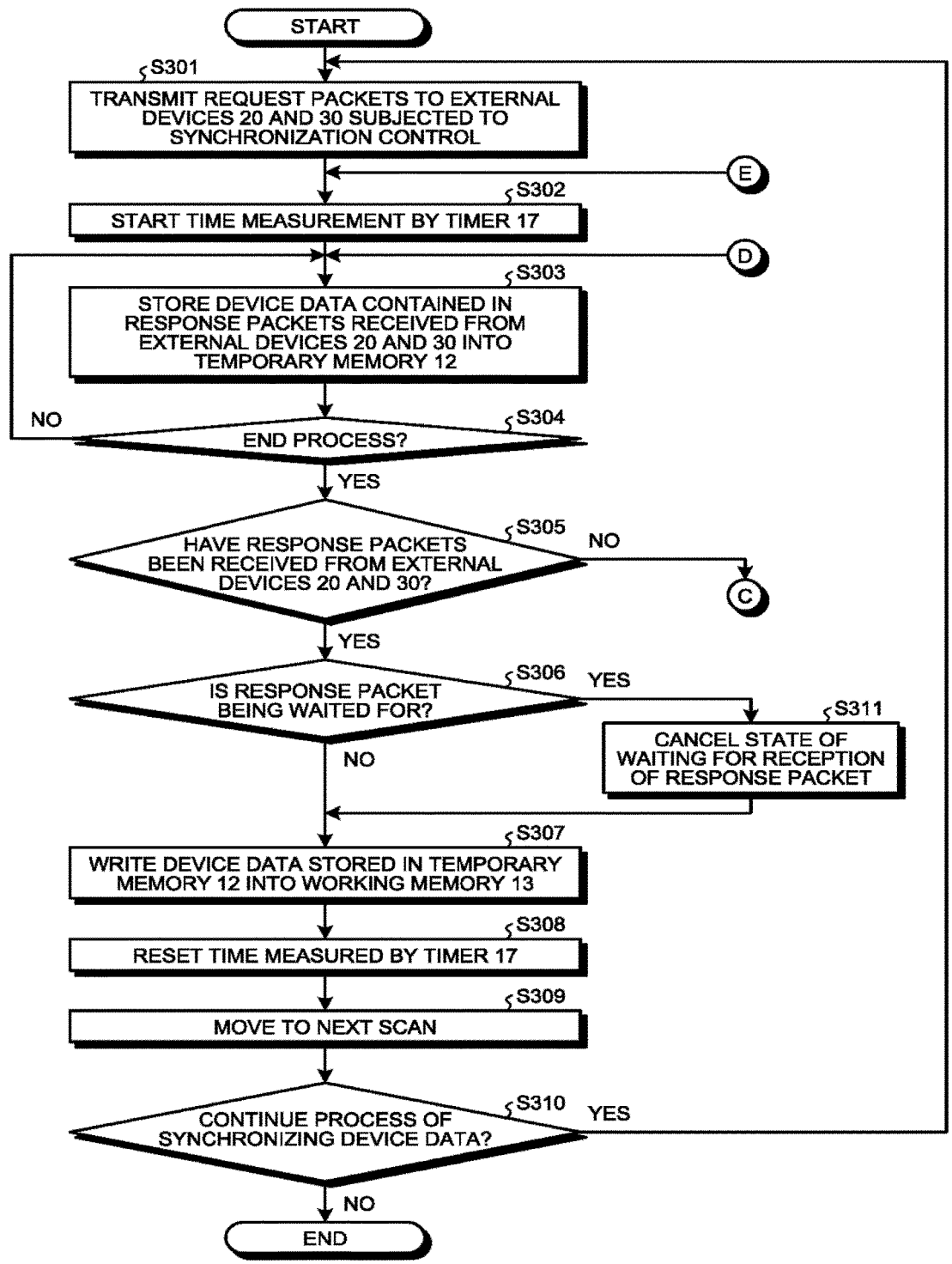
FIG. 6 is a flowchart illustrating an example of processing performed by the programmable controller according to the third embodiment.
Figure 7:
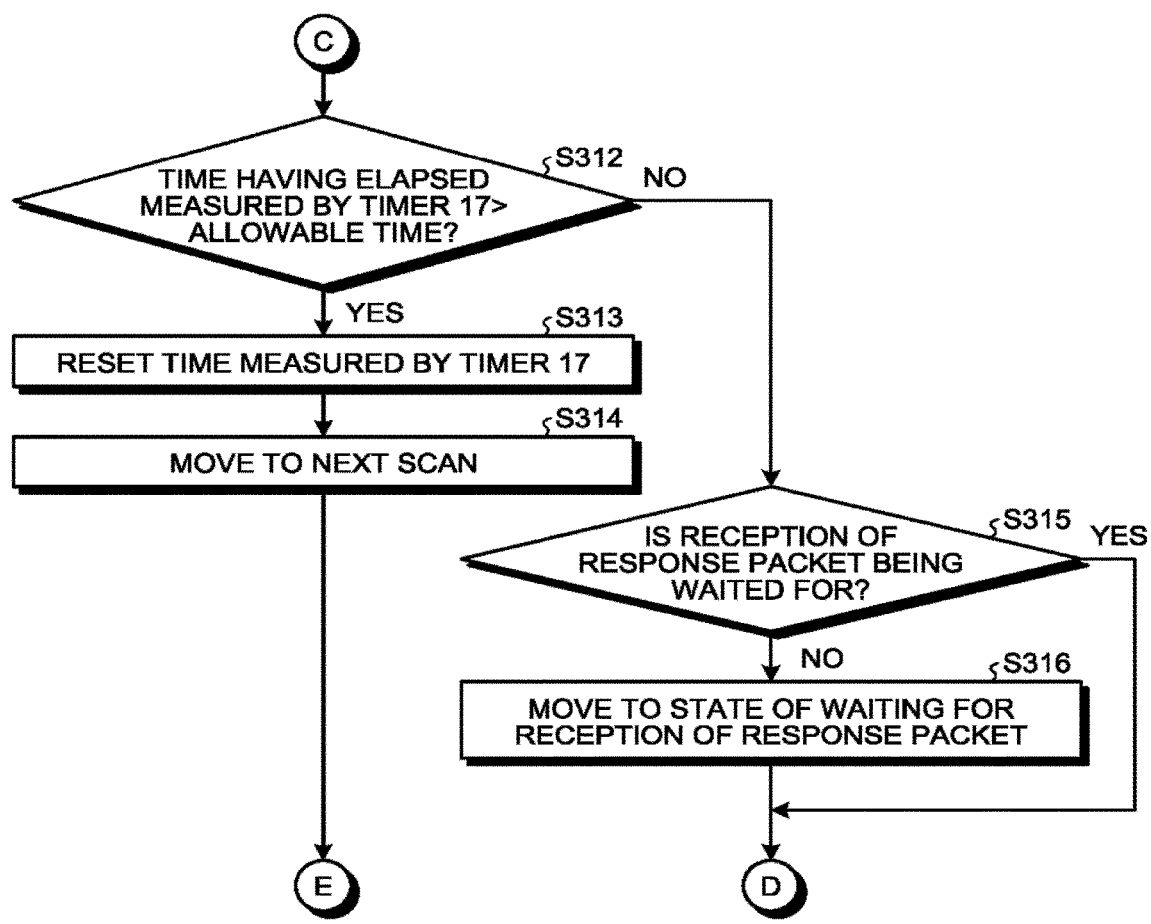
FIG. 7 is a flowchart illustrating an example of the processing performed by the programmable controller according to the third embodiment.

An example of processing performed by the programmable controller 10 according to a third embodiment will be described with reference to FIGS. 6 and 7. FIGS. 6 and 7 are flowcharts illustrating an example of processing performed by the programmable controller 10 according to the third embodiment.

As illustrated in FIG. 6, during execution of a scan, the programmable controller 10 transmits request packets to the external devices 20 and 30 that are the targets to be subjected to the synchronization control (step S301).

Subsequently, the programmable controller 10 starts measurement of time by the timer 17 (step S302).

Subsequently, the programmable controller 10 stores into the temporary memory 12 the device data contained in the response packets received from the external devices 20 and 30 (step S303). The programmable controller 10 successively stores the device data into the temporary memory 12 upon receiving the response packet.

Subsequently, the programmable controller 10 determines whether the scan is in the END process that is the final process of the scan (step S304).

If the result of the determination indicates that the scan is not in the END process (step S304, No), the programmable controller 10 returns to the procedure of step S303 described above.

If the result of the determination indicates that the scan is in the END process (step S304, Yes), the programmable controller 10 determines whether the response packets associated with the request packets transmitted in S301 have been received from the external devices 20 and 30 (step S305).

If the result of the determination indicates that the response packets have been received from both of the external devices 20 and 30 (step S305, Yes), the programmable controller 10 determines whether reception of a response packet is being waited for (step S306).

If the result of the determination indicates that the reception of the response packet is not being waited for (step S306, No), the programmable controller 10 writes the device data stored in the temporary memory 12 into the working memory 13 (step S307), and resets the time measured by the timer 17 (step S308).

Subsequently, the programmable controller 10 terminates the END process, moves to the next scan (step S309), and determines whether to continue the synchronization processing on the device data (step S310). The programmable controller 10 determines to continue the synchronization processing except, for example, when an abnormal process has occurred or when a halt instruction is made by a user.

If the result of the determination indicates that the synchronization processing on the device data is to be continued (step S310, Yes), the programmable controller 10 returns to the procedure of step S301 described above.

If the result of the determination indicates that the synchronization processing on the device data is not to be continued (step S310, No), the programmable controller 10 terminates the processing illustrated in FIG. 6.

If the result of the determination in step S306 described above indicates that the reception of the response packet is being waited for (step S306, Yes), the programmable controller 10 cancels the state of waiting for the reception of the response packet (step S311), and moves to the procedure of step S307 described above.

If the result of the determination in step S305 described above indicates that the response packet has not been received from at least one of the external devices 20 and 30 (step S305, No), the programmable controller 10 determines whether the time having elapsed measured by the timer 17 exceeds the allowable time (step S312).

If the result of the determination indicates that the time having elapsed measured by the timer 17 exceeds the allowable time (step S312, Yes), the programmable controller 10 resets the time measured by the timer 17 (step S313).

Subsequently, the programmable controller 10 terminates the END process, moves to the next scan (step S314), and returns to the procedure of step S302 described above. Specifically, when the time having elapsed measured by the timer 17 exceeds the allowable time during the running scan, the programmable controller 10 executes the next scan without retrieving the device data.

If the result of the determination in step S312 described above indicates that the time having elapsed measured by the timer 17 does not exceed the allowable time (step S312, No), the programmable controller 10 determines whether the reception of the response packet is already being waited for (step S315).

If the result of the determination indicates that the reception of the response packet is not being waited for (step S315, No), the programmable controller 10 moves to the state of waiting for the reception of the response packet (step S316) and returns to the procedure of step S303 described above. Conversely, if the result of the determination indicates that the reception of the response packet is being waited for (step S315, Yes), the programmable controller 10 returns directly to the procedure of step S303 described above.

In the processing of FIG. 6 described above, when the time having elapsed measured by the timer 17 exceeds the allowable time with the device data on either the external device 20 or the external device 30 being stored in the temporary memory 12, the programmable controller 10 may store into the working memory 13 only the device data stored in the temporary memory 12 and proceed with the processing in such a manner that reception of a response packet is not performed until the next scan is started. In the processing of FIG. 6, frame sequence numbers may be allotted in advance to the request packet and the response packet so as to correctly determine the association between the request packet and the response packet, and the programmable controller 10 may proceed with the processing in such a manner that, upon receiving a response packet, the programmable controller 10 refers to the frame sequence number allotted to the response packet to determine which scan the packet is associated with.

In the third embodiment, the programmable controller 10 holds the state of waiting for the reception of the response packet without moving to the next scan when the reception of the response packets from the external devices 20 and 30 that are the targets to be subjected to the synchronization control has not yet been completed but the time having elapsed from the transmission of the request packets is still within the allowable time. Thus, the programmable controller 10 can synchronize the device data within one scan as far as possible, preventing stagnation of execution of the scan.

Figure 8:
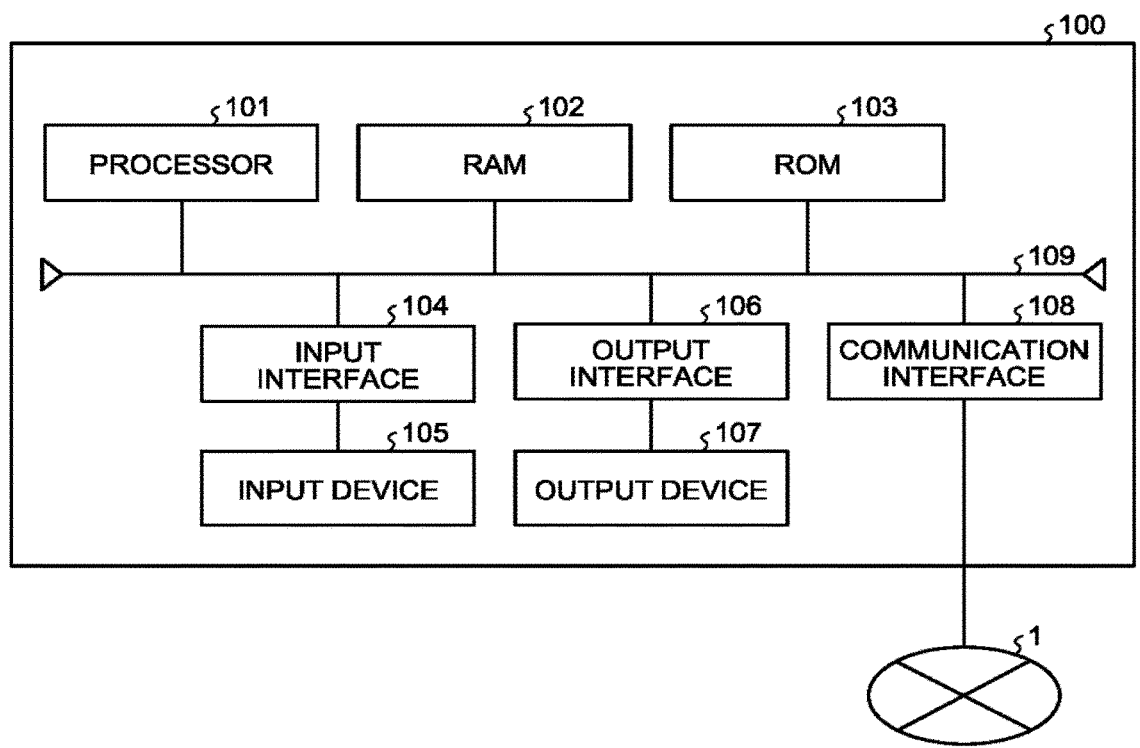
FIG. 8 is a diagram illustrating an example of a hardware configuration of a programmable controller according to an embodiment.

An example of a computer that implements controls similar to the controls by the programmable controller 10 described in the embodiments above will be described with reference to FIG. 8. FIG. 8 is a diagram illustrating an example of a hardware configuration of the programmable controller 10 according to the embodiment.

As illustrated in FIG. 8, a computer 100 serving as the programmable controller 10 includes a processor 101, a random access memory (RAM) 102, a read only memory (ROM) 103, an input interface 104, an input device 105, an output interface 106, an output device 107, a communication interface 108, and a bus 109, for example. The processor 101, the RAM 102, the ROM 103, the input interface 104, the input device 105, the output interface 106, the output device 107, and the communication interface 108 are connected to one another via the bus 109.

The RAM 102 is a storage device from and to which data can be read and written, and a semiconductor storage device such as a static RAM (SRAM) or a dynamic RAM (DRAM) is used as the RAM 102. A flash memory may be used instead of the RAM 102. The RAM 102 is used as a work area in which results of processing in the controls performed by the processor 101 are temporarily stored. The RAM 102 corresponds to the temporary memory 12 and the working memory 13, for example. The ROM 103 is a storage device from which programs and data can be read, and includes a programmable ROM (PROM). The ROM 103 is used for recording programs and data for implementing various controls performed by the processor 101. The ROM 103 corresponds to the program memory 11.

The input interface 104 is a circuit that transfers input signals from the input device 105 to the processor 101. The output interface 106 is a circuit that provides the output device 107 with an output according to an instruction from the processor 101. The communication interface 108 is a circuit that controls communication performed via the network 1. The communication interface 108 is a network interface card (NIC), for example. The input interface 104 and the output interface 106 may be an integrated unit. The communication interface 108 corresponds to the communication control unit 15.

The processor 101 reads programs stored in the ROM 103, expands the programs in the RAM 102, and executes instructions included in the programs expanded in the RAM 102. The processor 101 operates according to results of execution of instructions included in the programs, so that various controls corresponding to the functions provided by the synchronization control program 11a stored in the program memory 11 are implemented. The processor 101 corresponds to the control unit 14, for example.

The programs for implementing the controls corresponding to the functions provided by the synchronization control program 11a, and the data used in processing performed by the programs need not be stored initially in the ROM 103. For example, the programs for implementing the controls and the data used in processing performed by the programs may be stored in "another computer (or server)" connected with the computer 100 via a network such as a public line, the Internet, a LAN, or a wide area network (WAN), and the computer 100 may download and execute the programs and data from the computer or server.

The embodiments are not limited to the example in which the processor 101 reads and executes the programs stored in the ROM 103 so that the controls corresponding to the functions provided by the synchronization control program 11a are implemented, as illustrated in FIG. 8. The controls corresponding to the functions provided by the synchronization control program 11a may be implemented by a wired logic including a plurality of processing circuits in cooperation with one another for implementing the respective controls corresponding to the functions provided by the synchronization control program 11a. For example, application specific integrated circuits (ASICs) or field programmable gate arrays (FPGAs) can be applied to the processing circuits associated with the functions provided by the synchronization control program 11a.

The configurations presented in the embodiments above are examples of the present invention, and can be combined with other known technologies or can be partly omitted or modified without departing from the scope of the present invention.

REFERENCE SIGNS LIST 1 network; 10 programmable controller; 20, 30 external device.

The invention claimed is:

1. A programmable controller to periodically control a plurality of external devices, the programmable controller comprising:
a temporary memory;
a working memory; and
a controller, wherein
the controller
transmits request packets to each of the external devices, the request packets requesting transmission of device data to be used in control of the external devices, the external devices being targets to be subjected to synchronization control, and
acquires the device data from response packets received from the external devices in response to the request packets, and stores the acquired device data into the temporary memory,
wherein when the respective response packets in response to the request packets transmitted within a same control period are received from the external devices that are the targets to be subjected to the synchronization control, the controller writes the device data stored in the temporary memory into the working memory, within the control period within which the respective response packets are received, and
wherein when the respective response packets in response to the request packets transmitted within a same control period are not received from the external devices that are the targets to be subjected to the synchronization control, the controller does not write the device data stored in the temporary memory into the working memory, within the control period within which the respective packets are not received.

2. The programmable controller according to claim 1, wherein until the response packets in response to the request packets transmitted within the same control period are received from the external devices that are the targets to be subjected to the synchronization control, the controller holds a state of waiting for reception of the response packets.

3. A non-transitory computer-readable storage medium storing a synchronization control program causing a programmable controller to periodically control a plurality of external devices, to execute:
transmitting request packets to each of the external devices, the request packets requesting transmission of device data to be used in control of the external devices, the external devices being targets to be subjected to synchronization control;
acquiring the device data from response packets received from the external devices in response to the request packets, and storing the acquired device data into a temporary memory; and
when the respective response packets in response to the request packets transmitted within a same control period are received from the external devices that are the targets to be subjected to the synchronization control, writing the device data stored in the temporary memory into a working memory, within the control period within which the respective response packets are received; and
when the respective response packets in response to the request packets transmitted within a same control period are not received from the external devices that are the targets to be subjected to the synchronization control, not writing the device data stored in the temporary memory into the working memory, within the control period within which the respective packets are not received.

4. A programmable controller to periodically control a plurality of external devices, the programmable controller comprising:
a temporary memory;
a working memory; and
a controller to:
transmit request packets to each of the external devices, the request packets requesting transmission of device data to be used in control of the external devices, the external devices being targets to be subjected to synchronization control;
acquire the device data from response packets received from the external devices in response to the request packets, and stores the acquired device data into the temporary memory,
wherein when the respective response packets in response to the request packets transmitted within a same control period are received from the external devices that are the targets to be subjected to the synchronization control, the controller writes the device data stored in the temporary memory into the working memory, within the control period within which the respective response packets are received,
wherein when the respective response packets in response to the request packets transmitted within a same control period are not received from the external devices that are the targets to be subjected to the synchronization control, the controller does not write the device data stored in the temporary memory into the working memory, within the control period within which the respective packets are not received, wherein the controller includes a determiner to determine whether or not the response packets in response to the request packets transmitted within the same control period are received from the external devices that are the targets to be subjected to the synchronization control, and when the determiner determines that the response packets are not received, the controller holds a state of waiting for reception of the response packets.

* * * * *